Dec. 31, 1929.  H. G. KELLER  1,742,082
VARIABLE LIFT WING FOR AEROPLANES
Filed April 14, 1928   3 Sheets-Sheet 1
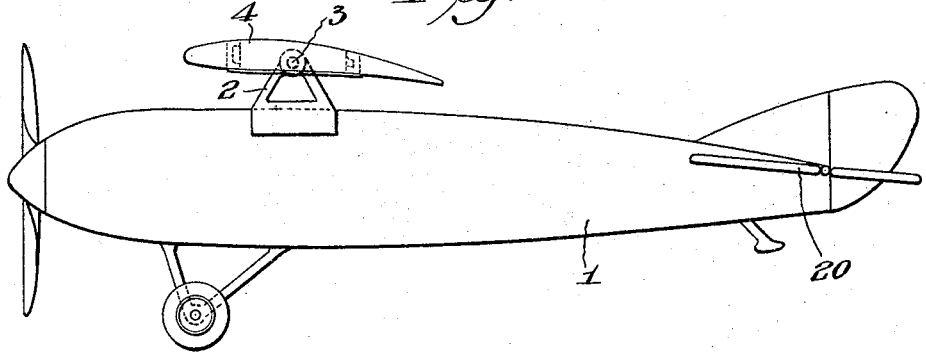
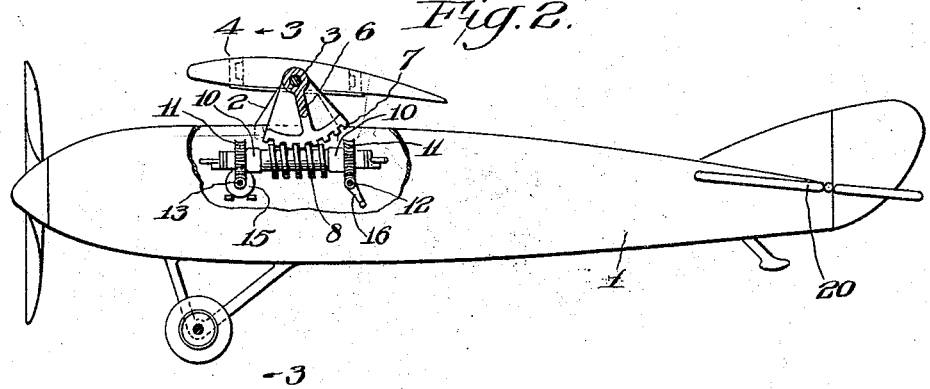
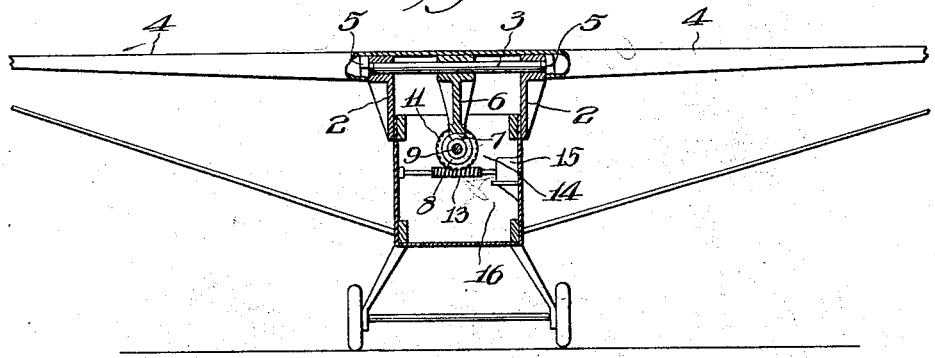
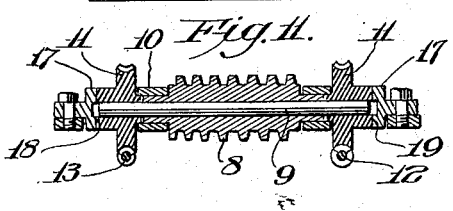
Henry G. Keller, INVENTOR
BY Victor J. Evans
ATTORNEY Dec. 31, 1929.  H. G. KELLER  1,742,082
VARIABLE LIFT WING FOR AEROPLANES
Filed April 14, 1928   3 Sheets-Sheet 2
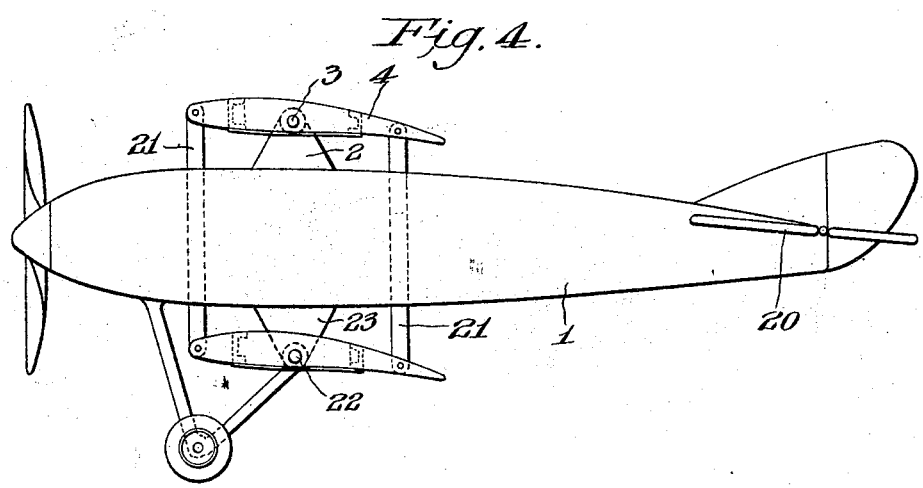
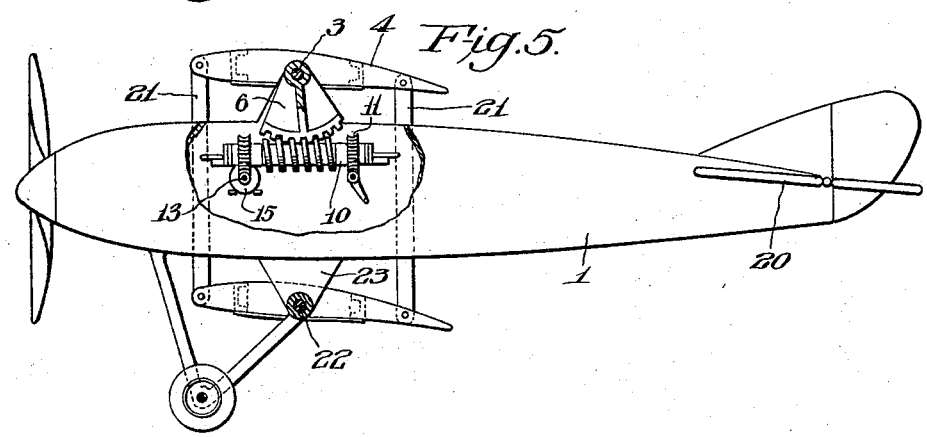
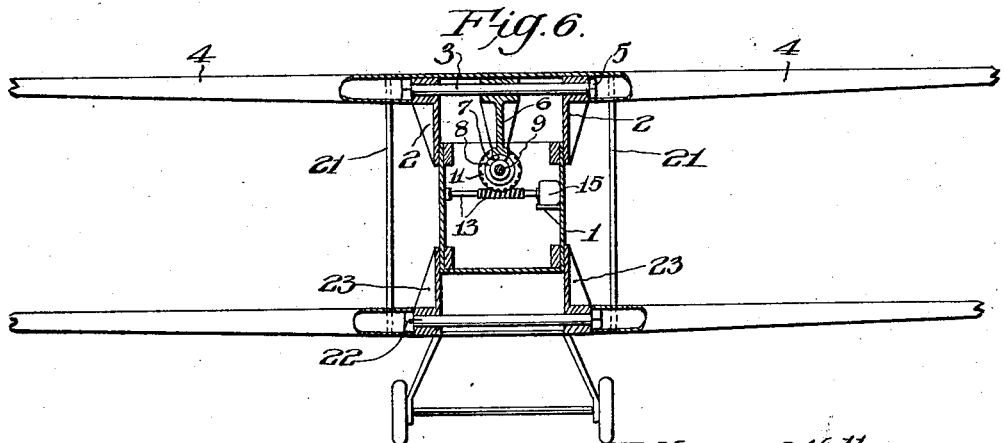
Henry G. Keller, INVENTOR
BY Victor J. Evans
ATTORNEY Dec. 31, 1929.  H. G. KELLER  1,742,082
VARIABLE LIFT WING FOR AEROPLANES
Filed April 14, 1928   3 Sheets-Sheet 3
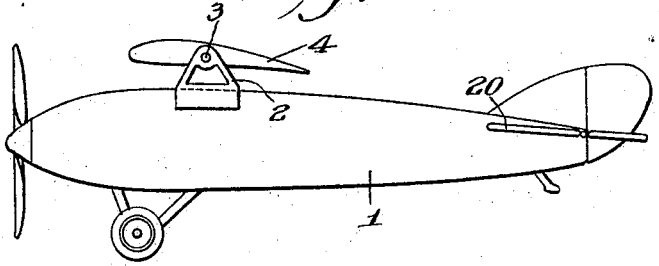
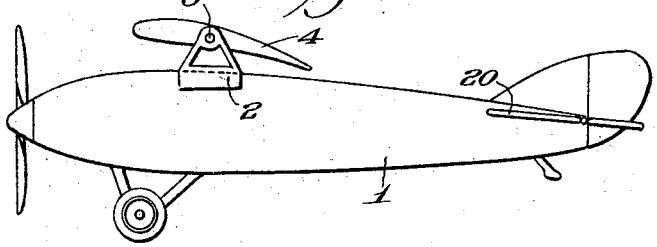
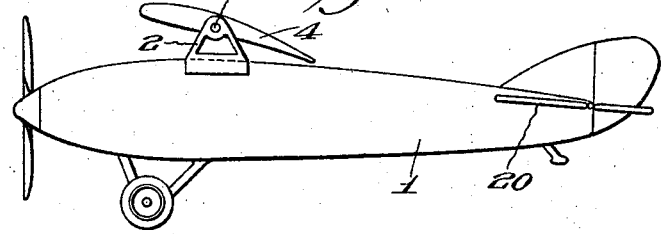
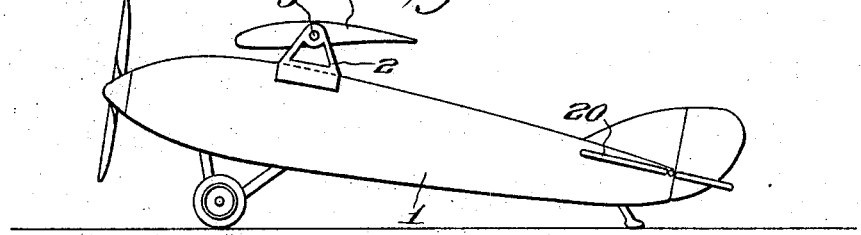
Henry G. Keller, INVENTOR
BY Victor J. Evans
ATTORNEY Patented Dec. 31, 1929

1,742,082

UNITED STATES PATENT OFFICE

HENRY G. KELLER, OF GLENSIDE, PENNSYLVANIA

VARIABLE LIFT WING FOR AEROPLANES

Application filed April 14, 1928. Serial No. 270,007.

The present invention relates to an improved lift wing for aeroplanes, the primary purposes being to materially increase the lifting power of an airship, enabling the ship to take off in a relatively short distance from the starting point, and yet permitting the ship to descend slowly, and likewise alight in a relatively short distance.

To accomplish this result it is the purpose to provide a construction, wherein the wing or wings are mounted for oscillatory movement on an axis transversely of the fuselage, in combination with means either automatic or manually manipulated for adjusting the wing to accommodate the angle of flight, the position of the stabilizer adjacent the tail end of the fuselage to be operated to govern the adjustment of the wing or wings, it depending entirely upon the operator or aviator as to whether or not it is desired to ascend quickly with a substantial degree of lifting power, or to descend relatively slowly, thereby avoiding any serious damage to the craft, thereby avoiding any undue strain upon the various parts of the craft when alighting.

Though the wings are not shown as being equipped with ailerons it is to be understood that such elements are to be used in connection with the wings, in order to permit the airship to bank in either direction laterally.

With this improved construction of wing, namely mounted for oscillatory movement, it is possible to carry a greater load than ordinarily, due to the variating lifting power resulting from the wing being capable of adjustment to increase or decrease the lifting power, especially in connection with the stabilizer adjacent the tail end of the fuselage, so that the ship may accommodate itself to the variating angle of flight. In other words due to the wing or wings being adjustable in cooperation with the operation of the stabilizer, the angle of flight varies, not to a damaging degree, but to a degree corresponding to the increased degree of lifting power.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1—is a view in side elevation of a monoplane showing the wing mounted on the fuselage for oscillatory movement, illustrating the wing in position for normal flight.

Figure 2—is a similar view showing the wing for normal flight, illustrating the fuselage broken away to disclose the operating means for the wing.

Figure 3—is a sectional view on line 3—3 of Figure 2.

Figure 4—is a view in side elevation of a conventional type of biplane, illustrating the wings in position for normal flight.

Figure 5—is a view similar to Figure 4 but showing the fuselage broken away to disclose the means for operating the two wings, said means being operated manually by means of a crank.

Figure 6—is a transverse sectional view of the biplane in Figures 4 and 5.

Figure 7—is a view in side elevation of a monoplane, showing the wing in a position for a light load.

Figure 8—is a view in side elevation of a monoplane showing the position of the wing in normal flight with a heavy load.

Figure 9—is a view in side elevation of a monoplane showing the wing in a position for descending at slow speed.

Figure 10—is a view in side elevation of a monoplane showing the position of the wing.

Figure 11—is an enlarged detailed sectional view through the clutch arrangement for actuating the segment or sector which in turn operates the wing.

Referring to the drawings, 1 identifies the fuselage either of the monoplane disclosed in Figures 1 to 3 inclusive and 7 to 10 inclusive or the biplane disclosed in Figures 4, 5 and 6, and mounted upon the fuselage in any convenient manner are bearings 2, in which a tilting or rocking shaft 3 is mounted.

This rocking shaft is constructed within the wing 4 which is of conventional type and design, and though not shown the wing is adapted to have the usual ailerons, in order to permit an operator or aviator to bank the ships. The wing 4 is movable with the shaft, so that when the shaft is rocked the wing may rock on its axis transversely of the fuselage.

Both ends of the shaft 3 are headed and provided with removable nuts as shown at 5, to hold the shaft in place and to prevent axial movement thereof.

A sector or quadrant 6 is movable with the shaft 3 and is provided with rack teeth, which engage with the worm 8 on a shaft 9.

This shaft is mounted in bearings 10 carried in any suitable manner on the frame 11 of the fuselage.

Carried by and mounted upon the opposite ends of the shaft 9 are worm wheels 11, which are in mesh with worms 12 and 13 mounted in bearings 14 depending from the frame of the fuselage. As in Figure 2 the worm 13 may be operated by a conventional type of small electric motor 15 receiving current from any suitable source possibly generated by a storage battery not shown to be carried in the fuselage in any convenient place. By operating this motor in one direction power is transmitted to the worm 13 which will transmit power to the worm 8 and thence to the segment or quadrant rocking the latter and thereby rocking the shaft 3, which will tilt the wing in the desired position for the purpose of controlling the ship, either for a light load on a normal flight, or be actuated for a heavy load on a normal flight. The load in this instance being heavier, it is necessary to position the wing for increased lifting power. The motor is designed to be of a construction enabling it to operate slowly, so that the connections between the motor and the wing may be designed and constructed to tilt the wing ever so slightly, either with its forward edge directedly upwardly or directed downwardly. In the former position the ship will be descending as in Figure 9, and when the latter position the airship will be in normal position on the ground, the wing disposed in a downward position after landing.

The worm wheel 7 receives power from the worm 12, its crank 16 to be manually operated by the operator or aviator for transmitting motion to the shaft 3, and thereby tilting the wing in the desired direction.

The shaft 9 is provided with a pair of clutches 17, one on each end, one to mesh with clutch teeth 18 on one of the worm wheels 11, the other to cooperate with the clutch teeth 19 on the other worm wheel 11. By throwing the clutches, one to mesh with one of the worm wheels, the shaft 9 may be rotated for transmitting motion to the segment rack in either direction by actuating the crank 16 for tilting the wing. By moving the other clutch in gear with the other worm wheel 11 and moving the other clutch out of gear, the motor may be used for actuating its adjoining worm wheel 11 for imparting rotary motion to the shaft 9. By operating the motor in either direction the wing may be tilted on its desired angle for either increasing the lifting power or for decreasing the lifting power or for disposing the wing in the desired position after landing.

While it is not shown the wing may be braced in any conventional manner by guy wires and in such a manner as not to hinder the manipulation of the wing.

Adjacent the tail end of the fuselage, a conventional type of stabilizer 20 is provided and which may be actuated in the usual way not shown, but the manipulation of the stabilizer is designed to be carried out to be performed for dispositioning the stabilizer, the manipulation of both designed to correspond with the variating angle of flight, the changing of the angle of flight depending entirely upon the angle of the wing.

In Figures 4, 5 and 6 a biplane is disclosed, wherein the upper and lower wings are connected by links or bars 21, so that the tilting operation of the upper wing may be transmitted to the lower wing, the shaft 22 for the lower wing mounted in suitable bearings 23 of the fuselage. Also in this construction of device the stabilizer is designed to be operated in order that the wings may be moved to vary the angle of flight. The bars or links 21 cause the upper and lower wings to move in unison.

The invention having been set forth, what is claimed is:

The combination with an aircraft including a fuselage provided with ustanding side bearings fixed to the fuselage of a rocking shaft in said bearings and having a depending segment rack centrally between the bearings, a wing fixed to and movable with said rocking shaft, the bearings at their upper ends fitting within the wing, a second shaft mounted on the inside of the fuselage in bearings thereof, the second shaft being below and at right angles to the rocking shaft and having a worm cooperatively engaged with the segment rack, the opposite ends of the second shaft having worm wheels, means below and at right angles to the second shaft and to be rotated and including worms engaging with the worm wheels for rotating the second shaft and its worm for imparting movement to the segment rack for tilting the wing, and a stabilizer adjacent the tail end of the fuselage for cooperation with the wing and therefore governing the angular flight.

In testimony whereof he affixes his signature.

HENRY G. KELLER.